(12) United States Patent
Howard

(10) Patent No.: US 8,197,581 B2
(45) Date of Patent: Jun. 12, 2012

(54) SELF-REGULATING BIO-GAS TREATMENT SYSTEM

(75) Inventor: Lowell Howard, Redmond, WA (US)

(73) Assignee: ESC Enviroenergy, LLC, Bellevue, WA (US)

( * ) Notice: Subject to any disclaimer, the term of this patent is extended or adjusted under 35 U.S.C. 154(b) by 184 days.

(21) Appl. No.: 12/150,086

(22) Filed: Apr. 23, 2008

(65) Prior Publication Data
US 2008/0257158 A1    Oct. 23, 2008

Related U.S. Application Data

(60) Provisional application No. 60/925,969, filed on Apr. 23, 2007.

(51) Int. Cl.
*B01D 53/02* (2006.01)

(52) U.S. Cl. .............. 96/130; 95/111; 95/115; 95/120; 95/126; 96/121; 96/123; 96/125; 96/126; 96/127; 96/150

(58) Field of Classification Search .............. 95/111, 95/115, 120, 126; 96/121, 123, 125–127, 96/130, 150
See application file for complete search history.

(56) References Cited

U.S. PATENT DOCUMENTS

| | | | | |
|---|---|---|---|---|
| 2,495,842 A * | 1/1950 | Gilliland | ........................ | 95/109 |
| 2,523,149 A * | 9/1950 | Scheeline | ........................ | 95/109 |
| 2,544,214 A * | 3/1951 | Berg | ........................ | 96/126 |
| 2,550,955 A * | 5/1951 | Berg | ........................ | 95/112 |
| 2,590,322 A * | 3/1952 | Imhoff et al. | ........................ | 95/112 |
| 2,630,877 A * | 3/1953 | Berg | ........................ | 95/112 |
| 2,631,727 A * | 3/1953 | Cichelli | ........................ | 208/310 R |
| 2,632,528 A * | 3/1953 | Berg et al. | ........................ | 95/112 |
| 2,638,999 A * | 5/1953 | Berg | ........................ | 95/14 |
| 2,647,587 A * | 8/1953 | Berg | ........................ | 96/126 |
| 2,684,124 A * | 7/1954 | Hines, Jr. | ........................ | 95/112 |
| 2,758,665 A * | 8/1956 | Francis, Jr. | ........................ | 96/181 |
| 2,764,252 A * | 9/1956 | Berg | ........................ | 95/14 |
| 2,992,895 A * | 7/1961 | Feustel et al. | ........................ | 423/239.1 |
| 3,917,797 A * | 11/1975 | Reed et al. | ........................ | 423/210.5 |
| 3,932,500 A * | 1/1976 | Duembgen et al. | ........................ | 562/600 |
| 4,047,906 A * | 9/1977 | Murakami et al. | ........................ | 95/109 |
| 4,061,477 A * | 12/1977 | Murakami et al. | ........................ | 95/109 |
| 4,083,923 A * | 4/1978 | Lippman et al. | ........................ | 423/79 |
| 4,207,082 A * | 6/1980 | Okamoto et al. | ........................ | 95/109 |

(Continued)

*Primary Examiner* — Robert J Hill, Jr.
*Assistant Examiner* — Christopher P Jones
(74) *Attorney, Agent, or Firm* — Dean A. Craine

(57) ABSTRACT

A self-regenerating bio-gas treatment system that uses the bio-gas instead of atmospheric are as media transport between adsorber and desorber tanks. Each tank includes at least four horizontally stacked and evenly spaced apart, perforated trays each capable being filled with fluidized carbon which migrates downward in the adsorber tank to remove contaminants from the bio-gas. With the bio-gas function as its media transport, the carbon media continuously moves downward over the perforated trays and eventually collected in the bottom of the adsorber tank. The spent carbon is then delivered to the desorber tank. The desorber tank is filled with an inert gas produced by an inert gas generator which causes the carbon media to be regenerated. The inert gas strips the carbon media of contaminates and is then delivered to a ground flare. The carbon media is returned to the adsorber tank and re-used to treat bio-gas. A plurality of heat exchangers, blowers, valves and interconnecting conduits keep the bio-gas, the inert gas, and the carbon media continuously flowing through the system thereby enabling the system to be used at different sizes of landfills or treatment plants.

4 Claims, 1 Drawing Sheet

U.S. PATENT DOCUMENTS

| | | | |
|---|---|---|---|
| 5,069,689 A * | 12/1991 | Goldhaar | 95/93 |
| 5,169,607 A * | 12/1992 | Krambrock et al. | 422/219 |
| 5,496,395 A * | 3/1996 | Yamazaki | 96/123 |
| 5,538,541 A * | 7/1996 | Vickery | 96/123 |
| 5,667,559 A * | 9/1997 | Vickery | 95/110 |
| 5,676,738 A * | 10/1997 | Cioffi et al. | 95/109 |
| 5,730,782 A * | 3/1998 | Heim et al. | 95/111 |
| 5,904,750 A * | 5/1999 | Cowles | 95/109 |
| 6,027,550 A * | 2/2000 | Vickery | 95/107 |
| 6,342,091 B1 * | 1/2002 | Menzel et al. | 95/167 |
| 6,508,858 B2 * | 1/2003 | Hirose et al. | 95/1 |
| 7,309,379 B2 * | 12/2007 | Dai et al. | 95/110 |
| 7,594,956 B2 * | 9/2009 | Knaebel | 95/107 |
| 2004/0226450 A1 * | 11/2004 | Dai | 96/150 |
| 2006/0144224 A1 * | 7/2006 | Howard et al. | 95/8 |
| 2006/0230930 A1 * | 10/2006 | Knaebel | 95/96 |
| 2008/0289504 A1 * | 11/2008 | Howard | 96/115 |
| 2009/0000482 A1 * | 1/2009 | Howard et al. | 96/108 |
| 2009/0308247 A1 * | 12/2009 | Knaebel | 95/111 |

\* cited by examiner

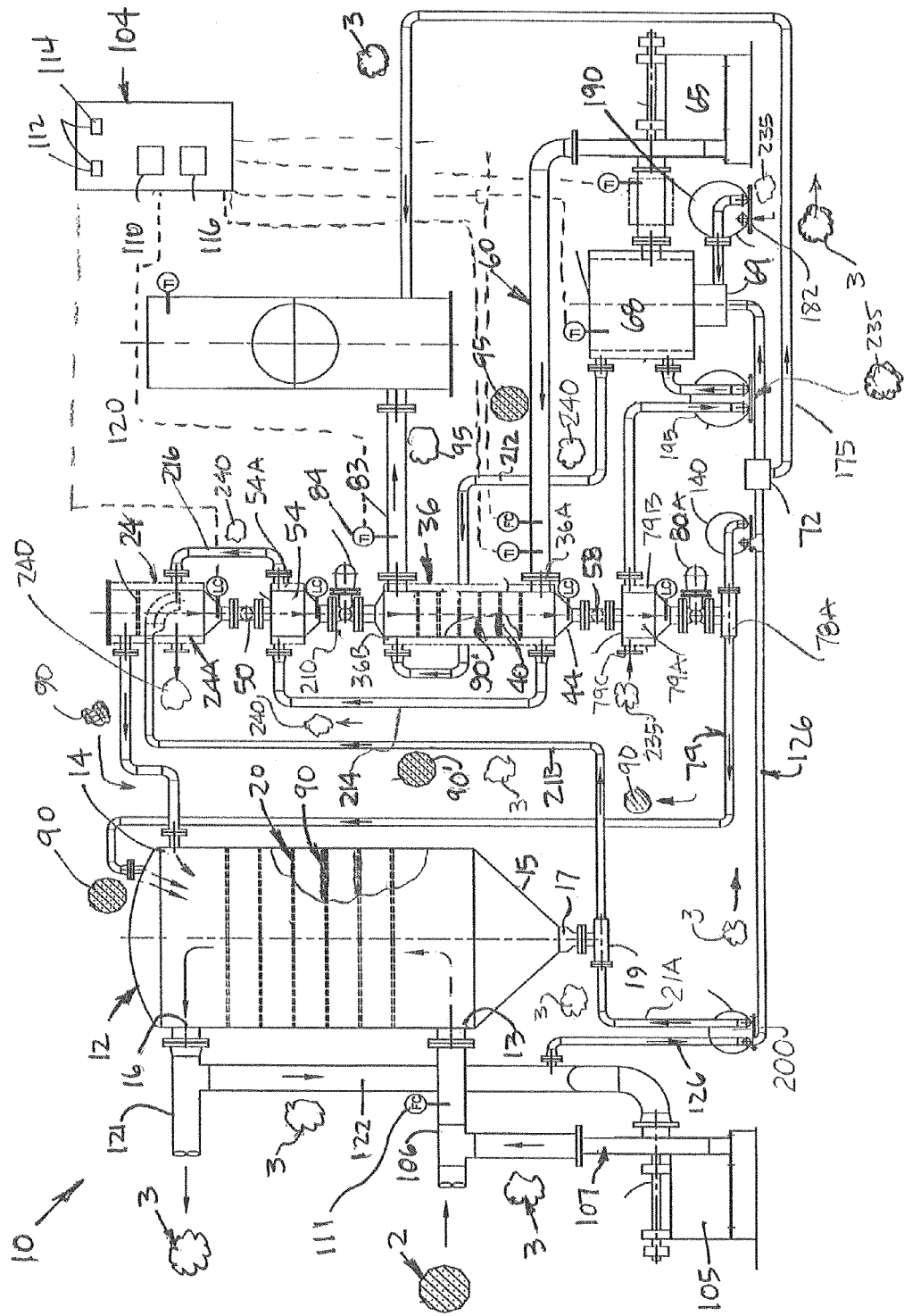

SELF-REGULATING BIO-GAS TREATMENT SYSTEM

This is a utility patent application which claims benefit of U.S. Provisional Application No. 60/925,969 filed on Apr. 23, 2007.

BACKGROUND OF THE INVENTION

1. Field of the Invention

This invention relates to systems for processing organic material, and more particularly to such systems that reduce emissions of bio-gas and the parasite load on landfills.

2. Description of the Related Art

Recent increases in energy prices has resulted in an increased focus on the use of energy from renewable sources. In particular, the generation of power from bio-gas sources, such as municipal digester and landfills, has become increasingly popular.

A major drawback of utilizing bio-gas from these sources is the contamination of the gas from volatile chemicals that fall into one of three major groups: volatile organic contaminants (such as benzene, toluene and xylene compounds known as 'BTEX'); volatile inorganic contaminants (such as hydrogen sulfide); and volatile species containing silicon or organosilicons (such as the silanes, silanols, and siloxanes). All three major groups of contaminants are undesirable due to various deleterious properties like corrosivity, toxicity, and physical abrasion to power generation equipment. The organosilicons are the most damaging, often significantly impairing power generation equipment and adding substantial cost to repairs and maintenance. It is readily apparent that it is desirable to remove the corrosive, toxic, and abrasive organosilicons from the bio-gas for more economical operation of power generation equipment.

Heretofore, a semi-fluidized activated carbon bed adsorption system has been used that is regenerated by the semifluidization of the spent carbon. Such systems typically use separate vessels for the adsorption and regeneration processes to occur. External pipes and valves are used to transport the spent and regenerated media from one separate chamber to another. This process is most economically applied to power generation systems that use relatively large flows of bio-gas, 1,000 standard cubic feet per minute (SCFM) to 15,000 SCFM.

Unfortunately, the semi-fluidized activated carbon bed absorption systems do not adequately strip or remove contaminates from the carbon media. It is believed that such deficiencies are caused by poor temperature control inside the desorber vessel. Also, bio-gas is able to escape around the valves causing explosive conditions and uncontrolled striping of contaminates from the carbon media. Also, when outside air is used as a transport medium for the carbon media, air contamination of the stripping gas occurs, which can cause explosions.

SUMMARY OF THE INVENTION

These and other objects of the invention are met by a self-regenerating bio-gas treatment system disclosed herein that uses a recyclable, fluidized, solid media transport to remove contaminates from contaminated bio-gas which is used to generate heat that supports the absorption and desorption. The treated bio-gas is also used to support combustion in a ground flare that destroys the contaminants.

A system includes raw, bio-gas containing contaminates delivered to the bottom of an adsorber tank. A fluidized, fine particle solid transport media is then added to the absorber tank capable of absorbing contaminates from the bio-gas at selected temperatures and pressures. The transport media descends inside the absorber tank over a plurality of stacked perforated trays located therein. The bio-gas flows upward in the absorber tank and across the perforated trays where it is exposed to the solid transport media. The contaminants in the bio-gas is then absorbed by the solid transport media. The cleaned bio-gas then travels to the top of the adsorber tank and then is partially delivered to an outside collection tank and to an inert gas generator used to heat outside air that is then used to heat the system and support combustion in the ground flare.

The contaminated solid transport media migrates downward inside the adsorber tank and is collected and delivered to the desorber tank. The contaminated solid transport media descends over a plurality of perforated trays located inside the desorber tank and stripped of contaminants by a heated inert gas, such as carbon dioxide. The cleaned or regenerated solid transport media is then collected from the bottom of the desorber tank and returned to the top of the adsorber tank, where it is reused to clean the contaminated bio-gas in the absorber tank. The contaminated inert gas leaves the desorber tank and is delivered to a ground flare where the contaminants are destroyed in the ground flare. The absorption and desorption of contaminants from the solid transport media are temperature sensitive. To create the necessary heat, hot exhaust gas created by the inert gas generator and delivered to the outer jackets formed around the desorber tank and various other components used in the system. To regulate the flow of bio-gas, inert gas, the temperature, and combustion, a plurality of valves, regulators, temperature sensors, flow sensors are used that connect to a central control panel.

An important features of the system is the use of the closed, separate adsorber and desorber tanks and the use of the biogas rather than atmospheric air to transport the solid transport media between the two tanks. Another important feature is that treated bio-gas is used to operate the inert gas generator that produces heat used in the jackets used in some components and supports combustion in the ground flare.

BRIEF DESCRIPTION OF THE DRAWINGS

FIG. 1 is a diagram of the improved bio-gas treatment system disclosed herein.

DESCRIPTION OF THE PREFERRED EMBODIMENT(S)

Referring to FIG. 1 there is shown a self-regenerating bio-gas treatment system 10 that includes a closed and separate adsorber tank 12 and a desorber tank 36. Each tank 12, 36 includes at least four transversely aligned, stacked and evenly spaced apart, perforated trays 20, 40, respectively each capable being filled with pelletized carbon or silica gel material, hereinafter called transport media 90. During use, raw, contaminated bio-gas 2 enters the adsorber tank 12 through a lower inlet opening 13 at the bottom of the tank 12. Located at the top of the adbsorber tank 12 is an upper inlet opening 14 through which the transport media 90 is delivered. The transport media 90 has sufficient small particle size so that it fills, end eventual falls over the edges of the trays 20. Optional perforations are formed in the trays to allow bio-gas to seep through the layer of transport media deposited on the tray 20. The transport media 90 is continuously added to the absorber tank 12 until all of the trays 20 are filled. As the transport media 90 descends in the tank 12, it absorbs more contaminates. When the last tray 20 is filled with transport media 90 and more transport media 90 is added to the tank 12, the transport media 90 in the last tray 20 eventually falls from the bottom tray 20 and onto the bottom opening 17 of the tank 12.

When placed inside the absorber tank 12, the bio-gas 2 and the transport media 90 interact to remove contaminants from the bio-gas 2. A portion of the cleaned bio-gas, denoted 3, exits through an upper outlet opening 16 and delivered to a collection tank (not shown) while another portion of the bio-gas 3 is delivered to an inert gas generator 68, discussed further below.

The adsorber tank 12 includes a lower hopper 15. Connected to the lower hopper 15 is a spent media eductor 19. One end of the eductor 19 is connected to a short eductor-blower conduit 21A that connects to a blower 200 while the opposite end is connected to an eductor-spent media conduit 21B. During use, the blower 200 forces the treated bio-gas 3 through the conduit 21A which then forces the contaminated transport media 90' through the eductor-spent conduit 21B.

The opposite, distal end of the eductor-spent media conduit 21B is connected to a spent media hopper 24. The spent media hopper 24 includes an isolated heat exchange jacket 24A which is filled with hot air to heat the transport media 90' as it flows therein. Located below the spent media hopper 24 is an inlet/hopper ball valve 50. During operation of the system 10, the ball valve 50 is used to control the rate of flow of the transport media 90' through the system 10. Connected to the lower end of the inlet/hopper ball valve 50 is an inlet hopper 54. The inlet hopper 54 also includes an outer closed heat exchanger 54A designed to heat the transport media 90' as it flows through the inlet hopper 54. Connected to the bottom of the inlet hopper 54 is a rotary valve 210 that connects to the top opening on the desorber tank 36.

The desorber tank 36 also contains a plurality of stacked, perforated trays 40 similar to the trays 20 used with the adsorber tank 12. During operation, the trays 40 are filled with contaminated transport media 90' delivered from the adsorber tank 12. Connected to an inlet port 36A located on the bottom of the desorber tank 36 is an inert gas delivery line 60 which delivers inert gas 95 from the inert gas blower 65. When delivered to the desorber tank 36, the inert gas 95 fills the center cavity formed in the desorber tank 36 and removes contaminants from the contaminated transport media 90' as it descends in the desorber tank 36 via the educator-spent media conduit 21B and the spent media hopper 24. The desorber tank 36 also includes an outer heat exchange jacket 36B that surrounds the center cavity which is filled with hot air 240 and used to heat the transport media 90' as it flows through the desorber tank 36.

Attached to the bottom of the desorber tank 36 is a desorber outlet hopper 44 which collects the cleaned transport media 90 from the desorber tank 36. The desorber outlet hopper 44 is connected to a ball valve 58. Connected to the ball valve 58 is a pressure barrier hopper 79A. Surrounding the barrier hopper 79A is a heat exchange jacket 79B. The heat exchange jacket 79B includes an outer port 79C that enables outside cool air 235 to be drawn into the jacket 79B to cool the transport media 90.

Located below the barrier hopper 79A is a rotary valve 80A which connects to an eductor 78A. During operation, the cleaned transport media 90 travels from the desorber tank 36, through the ball valve 58, through the barrier hopper 79A, through the rotary valve 80A, and through an eductor 78A. A blower 140 then forces the transport media 90 via a conduit 79 to the absorber tank 12.

In the preferred embodiment, the inert gas 95 is carbon dioxide produced by burning methane gas 3 in the inert gas generator 68. The inert gas generator 68 is connected to the inert gas blower 65 that transmits the inert gas 95 via a conduit 60 to the lower opening 36A formed on the desorber tank 36. Connected to the upper end of the desorber tank 36 is a upper conduit 83 that connects to a ground flare 120 where the contaminants carried by the inert gas 95 are burned.

The inert gas generator 68 receives treated methane gas 3 from a safety valve 72 controlled by a process controller 110 located in the electrical control panel 104. When the methane gas 3 is burned, the carbon dioxide 95 produced is heated to approximately 600 to 1000 degrees. Because carbon dioxide 95 is chemically inert, it is an ideal inert gas for the system 10. The process controller 110 monitors the burners used in the ground flare 120 and in the inert gas generator 68 during use. In the preferred embodiment, a safety valve 72 is connected to a gas conduit 126 that connects at one end to a secondary treated gas line 122 that extends between the primary treated gas line 121 and the re-circulating blower 105. The bio-gas 3 in the gas conduit 126 is pressurized. The safety valve 72 is connected to a secondary gas conduit 175 that connects to the ground flare 120. Connected to the burner 69 is a blower 190 that is connected to an outside air inlet port 182 to control the amount of outside air 235 delivered to the inert gas burner 68.

In the preferred embodiment, the transport media 90 is a fine carbon particle approximately 0.02 to 0.1 inch in diameter. In another embodiment, the transport media 90 is silica gel approximately 1/16 inch in diameter. The amount of transport media 90 used in the system 10 is dependent on the size of the absorber tank 12, and the amount of contaminant contained in the raw bio-gas 2.

In the preferred embodiment, the control panel 104 modulates the flow of outside air 235 to the inert gas generator burner 69 via the blower 195, so that the inert gas' temperature is maintained at 750 degrees F., and the oxygen content is maintained below 8%. Single loop controllers 112, 114, located in the control panel 104 are used to monitor and maintain this temperature. Connected to the contaminated inert gas conduit 83 is a temperature sensor 84 that connects to the control panel 104. An oxygen sensor 116 is located in control panel 104, and monitors the oxygen content of the inert gas 95, as it leaves the inert gas generator 68. Also, in the preferred embodiment, a flow control indicator 111 is connected to the primary raw gas conduit 106 that connects to the lower input opening 13 formed on the adsorber tank 12. The recirculation blower 105 connects via a secondary raw gas conduit 107 to the primary raw gas conduit 106 to maintain adequate flow of raw, contaminated bio-gas 2 through the system 10.

It should be noted, that in the above described system that the desorber tank 36 includes inlet and outlet hoppers 54, 79A, respectively. The purpose of the inlet and outlet hoppers 54, 79A, respectively, is to isolate the bio-gas 3 used for transport of the transport media 90, from the inert gas 95 in the desorber tank 36. Control panel 104 uses programmable logic controllers 110 to control the ball valves 50 and 58, control the blowers, and regulate the delivery of bio-gas 3 to the burners to control the process.

An important aspect of the system 10 is that the absorption and desorption processes temperature sensitive. During operation, the volume of cool outside air 235 enters the system 10 is controlled by the blowers 190, 195. The outside air 235 through blower 140 is transmitted to an outer heat exchange jacket located around the inert gas generator 68. From the jacket surrounding the inert gas generator 68, the hot air 240 is then transmitted via a conduit 212 to the upper air inlet port on the desorber tank 36. The hot air 240 then fills the heat exchange jacket surrounding the desorber tank 36 and exits therefrom via an intermediate conduit 214. The upper end of the intermediate conduit 214 connects to inlet hopper 54. The hot air 240 is then transported via a second intermediate conduit 216 to the spent media hopper 24. The hot gas 240 then exist the spent media hopper 24 through an exhaust gas outlet port.

During operation, contaminated bio-gas 2 enters the inlet port 13 on the adsorber tank 12. The transport media 90 is then delivered to the top opening 14 of the adsorber tank 12 and begins to fill the first tray 20. In the preferred embodiment, each tray 20 including a plurality of 0.143 inch diameter holes, approximately ½ inch spaced apart formed therein. The holes are sufficiently small and the size of the transport media pellets are sufficiently small so that the force exerted by the upward flow of the bio-gas 2 through the holes precludes the carbon media 90 from falling through the holes 28. When the layer of transport media 90 reaches the height of the tray dam, it falls into the tray hopper, and fills. When the upward force exerted by the bio-gas 2 is exceeded in the hoppers, the particles of transport media 90 fall into the lower tray 20. When all of the trays 20 are filled, the carbon media 90 is continuously added and continuously removed from the adsorber tank 12.

The contaminated carbon media 90' is collected in the lower hopper 15 and delivered to the spent media hopper 24. From the spent media hopper 24, the contaminated carbon media 90' is then delivered through the ball valve 50 and then to the top inlet opening formed in the desorber tank 36. Once the contaminated carbon media 90' is delivered into the desorber tank 36, and the four trays 40 are filled with contaminated carbon media 90', the continuously flowing heated inert gas 95 removes the contaminates from the contaminated carbon media 90', and delivers it to the ground flare 120.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An improved biogas treatment system, comprising:
   a. an adsorber tank that includes at least six horizontally stacked and evenly spaced apart, perforated trays, each said tray capable being filled with pelletized carbon, said adsorber tank includes a bottom opening and a raw biogas inlet port located near the bottom of said tank and a carbon ingress port located near the top of said tank and above the top said tray so that said pelletized carbon may fall into lower said trays and into said bottom opening when released into said tank;
   b. a spent media hopper connected to said bottom opening on said absorber tank used to collect contaminated pelletized carbon from said trays located in said absorber tank, said spent media hopper includes an outer heat exchange jacket used to heat said contaminated pelletized carbon delivered from said absorber tank;
   c. a desorber inlet hopper connected to said spent media hopper and used to receive said heated contaminated pelletized carbon from said spent media hopper, said desorber inlet hopper includes an outer heat exchange jacket used to heat said contaminated pelletized carbon delivered from said spent media hopper;
   d. a desorber tank connected to said desorber inlet hopper, said desorber tank receives said heated contaminated pelletized carbon from said desorber inlet hopper said desorber tank includes a plurality of horizontally aligned, stacked perforated trays capable of being filled with said pelletized carbon from said absorber tank, said desorber tank filled with a heated inert gas containing less than 8% oxygen, said desorber tank further includes a surrounding outer heat exchange jacket used to further heat said heated contaminated pelletized carbon located on said perforated trays to produce clean pelletized carbon;
   e. a biogas delivery conduit connected to said raw biogas inlet port on said absorber tank;
   f. an outlet hopper connected to said desorber tank and used to collect said clean pelletized carbon from said desorber tank;
   g. a cleaned carbon delivery conduit extended between said outlet hopper on said desorber tank and said absorber tank;
   h. an inert gas generator connected to said outer heat exchanger on said desorber tank, said inert gas generator configured to produce hot inert gas that flows through said outer heat exchanger jacket surrounding said desorber tank, said inert gas then flows through said outer heat exchange jackets on said desorber inlet hopper and said spent media hopper, said inert gas being sufficiently hot to heat said pelletized carbon located inside said desorber tank and remove contaminants from said pelletized carbon, said inert gas generator includes an outer heat exchange jacket;
   i an inert gas blower coupled to said outlet hopper, said inert gas blower forces said clean pelletized carbon delivered to said outlet hopper through said cleaned carbon delivery conduit and to said carbon ingress port on said absorber tank;
   j. at least one recirculation blower connected to said contaminated carbon transfer conduit or said cleaned carbon delivery conduit to assist the flow of said pelletized carbon there through;
   k. an outside air source connected to said inert gas generator;
   l. a hot air conduit extending between said outer heat exchange jacket on said inert gas generator and said outer heat exchanger jacket on said desorber tank;
   m a hot air conduit extending between said outer heat exchanger jacket on said desorber tank and said said outer heat exchange jacket on said desorber inlet hopper;
   n a hot air conduit extending between said outer heat exchanger on said desorber inlet hopper and said outer heat exchanger on said spent media hopper;
   o. a ground flare; and,
   p. an inert gas conduit located between said desorber tank and said ground flare to deliver contaminated inert gas from said desorber tank to said ground flare for destruction.

2. The system as recited in claim 1, further including a blower connected to said inert gas burner, said blower connected to an outside air inlet port and used to control the flow of outside air delivered to said inert gas burner.

3. The system as recited in claim 1, wherein said inert gas is carbon dioxide.

4. The system as recited in claim 1, further including a blower connected to said outside air source.

* * * * *